Nov. 18, 1947.  J. K. SEITZ  2,430,957
BELT
Filed July 23, 1945
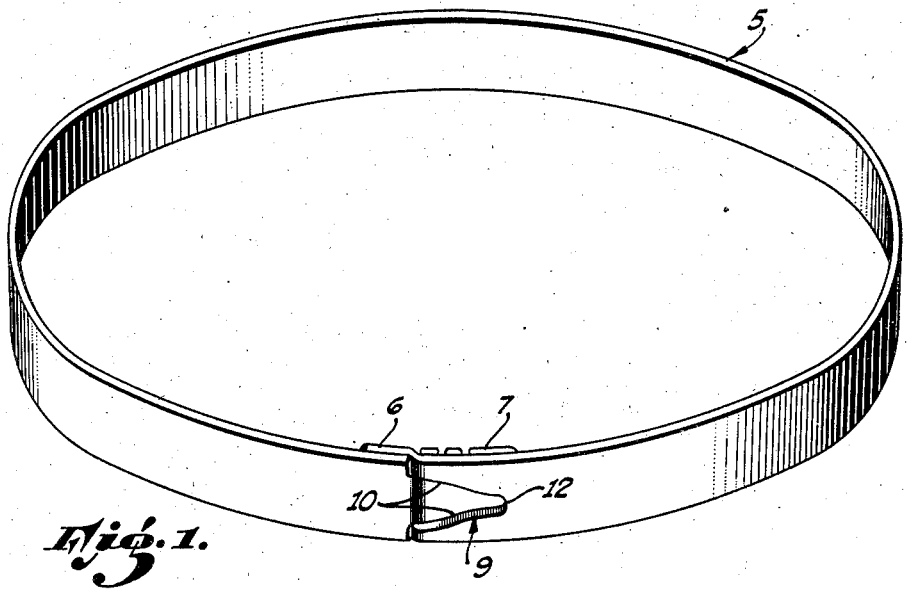
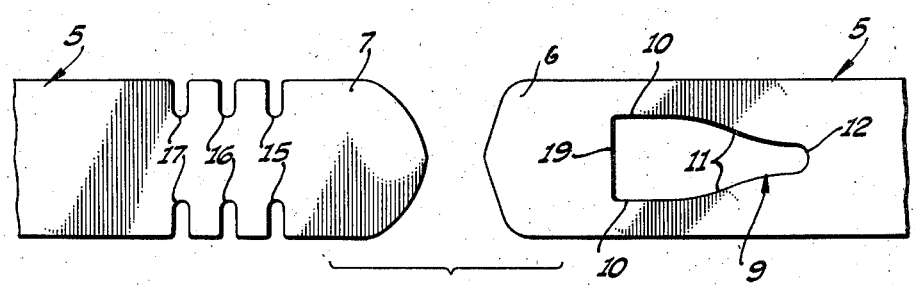
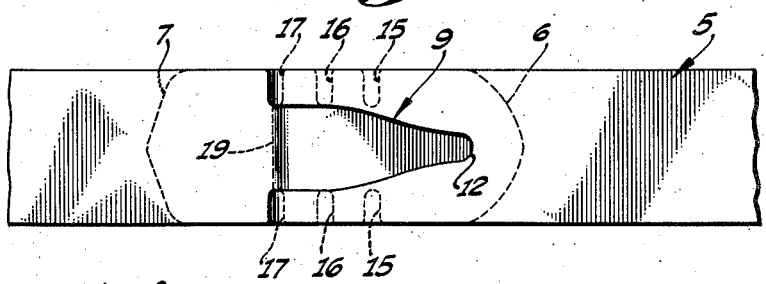
JOSEPH K. SEITZ,
INVENTOR
BY
ATTORNEY.

Patented Nov. 18, 1947

2,430,957

UNITED STATES PATENT OFFICE 2,430,957

BELT

Joseph K. Seitz, Los Angeles, Calif.

Application July 23, 1945, Serial No. 606,644

5 Claims. (Cl. 2—321)

This invention relates to supporting means, such as personal belts, and particularly to an improvement in the locking or attaching means for the ends of such belts.

The general arrangement for attaching the ends of straps or belts without the use of buckles is known, reference being made to U. S. Patent No. 212,837 of March 4, 1879, and U. S. Patent No. 925,963 of June 22, 1909, the latter patent disclosing and claiming a hose supporter in which no buckle or other extraneous element is used for attaching the ends of the supporter band. The present belt attachment is an improvement over prior known supporting bands, in that it provides for minute variations in length together with an ease of manipulation in the attaching and detaching operations. The belt may be constructed of leather, woven cord or fabric, plastic, thin metal, or any material sufficiently pliable to be used as a belt. The shape of the aperture is such as to facilitate the insertion of the opposite end of the belt and the turning thereof to provide the necessary interlock of the two ends of the belt together with a pleasing appearance.

The principal object of the invention, therefore, is to provide an improved belt which utilizes the belt configurations for interlocking the ends thereof.

Another object of the invention is to provide an improved form of interlocking belt which is adjustable in small degrees.

A further object of the invention is to provide an improved locking arrangement for a buckleless belt.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a perspective view of a belt embodying the invention.

Fig. 2 is a partial view of the belt showing the two ends of the belt before attachment, and Fig. 3 is a partial view of the belt showing the ends of the belt in a locked position.

Referring now to the drawings, in which the same numerals identify like elements, a belt 5, of any suitable material, such as mentioned above, has two ends 6 and 7 slightly tapered or pointed in the usual form. Near the tip of belt end 6 is provided a triangular aperture 9 having parallel sides 10, converging sides 11, and a rounded apex portion 12. The belt end 7 is provided with a plurality or series of diametrically opposed notches 15, 16, and 17, the distance between the parallel sides 10 of the aperture 9 being substantially equal to the distance between the bottom of the notches 15, 16 and 17. Although only three notches have been shown, it is to be understood that more notches may be provided, if desired.

To interlock the two ends 6 and 7, as shown in Fig. 3, the end 7 is inserted in the aperture 9, it being observed that the aperture 9 is sufficiently long to accommodate the width of the belt even when the ends of the belt are at an angle less than a right angle. The end 7 is inserted in the aperture to the desired pair of notches 15, 16, or 17, determined by the desired length of the belt, the end 7 then being turned so that the two selected notches lie against the sides 10 of the aperture and the center portion between notches lies against the end edge 19. By providing the particular triangular shape shown by the aperture 9, this operation is very simple and easy to perform both during the attachment of the ends and the detachment thereof.

The plurality of notches may be spaced as closely together as desired to provide for very small adjustments in length of the belt, it being understood that a belt is generally selected which would permit the last pair of notches 17 to be used so that the appearance of the belt in its locked position will be as shown in Fig. 3. Should it be desired to shorten the belt, another notch may be easily made to the left of the notch 17 so that the belt will always appear as shown in Fig. 3.

It is understood that one pair of notches and a series of apertures would function in a similar manner, but in this modification, the adjustment from one aperture to another would be too great to be practical, while with a plurality of notches and a single aperture small adjustments of the belt are obtainable.

I claim:

1. A belt comprising a band having ends, one of said ends being provided with an elongated aperture of a predetermined width, and the other of said ends being provided with a plurality of series of diametrically opposing slots adapted to accommodate the portions of said first mentioned end between the sides of said aperture and the edges of said belt, said slots having sides substantially perpendicular to the edges of said band.

2. A belt comprising a band having two ends, one of said ends having a triangular aperture therein, a portion of said aperture having parallel sides over a predetermined length thereof, and the other end of said belt having a plurality of diametrically opposed notches therein, the distance between the parallel sides of said aperture being equal to the distance between the bottom edges of said notches and the sides of said notches being parallel and substantially perpendicular to the edges of said band.

3. A buckleless belt comprising a band having two ends adapted to be joined together, one end of said belt having a triangularly shaped aperture therein of a length greater than the width of said band, and the other of said ends having a series of diametrically opposing notches with parallel sides perpendicular to the edges of said band, the portions of said first mentioned end between the sides of said aperture and the edge of said belt being accommodated in any pair of opposing notches when said second mentioned end of said belt is inserted into said aperture and made parallel with the first mentioned end of said belt.

4. A buckleless belt in accordance with claim 3, in which a portion of said aperture has parallel sides and another portion has converging sides with a rounded apex.

5. A belt comprising a band having two ends adapted to be joined together, one end of said belt having a plurality of uniform length diametrically opposing slots with parallel sides substantially perpendicular to the edges of said band, and of a width comparable to the thickness of said band, the bottoms of said slots being separated a predetermined distance, and the other end of said band having a triangularly shaped aperture therein of a length greater than the width of said band and of a width comparable to said predetermined distance between the bottoms of said slots, both ends of said band being positioned on the inside of said band when joined together.

JOSEPH K. SEITZ.

REFERENCES CITED

The following references are of record in the file of this patent:

UNITED STATES PATENTS

| Number | Name | Date |
|---|---|---|
| 212,837 | Carroll | Mar. 4, 1879 |
| 925,963 | Stoldt | June 22, 1909 |
| 1,810,027 | Moran et al. | June 16, 1931 |
| 2,361,506 | Smith | Oct. 31, 1944 |